(12) United States Patent
Nakazawa

(10) Patent No.: US 8,727,416 B2
(45) Date of Patent: May 20, 2014

(54) VEHICLE BODY REAR PORTION STRUCTURE

(75) Inventor: Yoshiki Nakazawa, Shizuoka-ken (JP)

(73) Assignee: Suzuki Motor Corporation, Shizuoka-ken (JP)

(*) Notice: Subject to any disclaimer, the term of this patent is extended or adjusted under 35 U.S.C. 154(b) by 0 days.

(21) Appl. No.: 13/700,575

(22) PCT Filed: Mar. 7, 2011

(86) PCT No.: PCT/JP2011/055231
§ 371 (c)(1),
(2), (4) Date: Nov. 28, 2012

(87) PCT Pub. No.: WO2011/152097
PCT Pub. Date: Dec. 8, 2011

(65) Prior Publication Data
US 2013/0119711 A1 May 16, 2013

(30) Foreign Application Priority Data
May 29, 2010 (JP) .................................. 2010-123623

(51) Int. Cl.
*B60R 11/06* (2006.01)

(52) U.S. Cl.
USPC ................. 296/37.16; 296/24.43; 224/544; 206/349

(58) Field of Classification Search
USPC ............... 296/24.3, 24.4, 24.43, 37.1, 37.8, 296/37.16, 68.1; 224/42.39, 275, 543, 544, 224/902; 206/335, 349; 180/68.5
See application file for complete search history.

(56) References Cited

U.S. PATENT DOCUMENTS

| 7,004,274 B2 * | 2/2006 | Shibasawa et al. .......... 180/68.5 |
| 2009/0197456 A1 * | 8/2009 | Kawai et al. ................. 439/465 |

FOREIGN PATENT DOCUMENTS

| JP | 57-31249 U | 2/1982 |
| JP | 61-157036 U | 9/1986 |
| JP | 07-069378 A | 3/1995 |
| JP | 2004-352079 A | 12/2004 |
| JP | 2004345452 A | 12/2004 |
| JP | 2005-112284 A | 4/2005 |
| JP | 2011031815 A * | 2/2011 |

OTHER PUBLICATIONS

International Search Report for Application No. PCT/JP2011/055231 dated Apr. 19, 2011.

* cited by examiner

*Primary Examiner* — Glenn Dayoan
*Assistant Examiner* — Jason S Daniels
(74) *Attorney, Agent, or Firm* — Lerner, David, Littenberg, Krumholz & Mentlik, LLP

(57) ABSTRACT

A battery 4 and a toolbox storage portion 5 are provided in a laterally arranged state on a reverse side of a seatback 2 of a vehicle, a toolbox 9 stored in the toolbox storage portion 5 is exposed when the seatback 2 is tilted forward, and an emergency stop switch 10 of the battery 4 is exposed so as to be operable when the toolbox 9 is removed from the above toolbox storage portion 5.

6 Claims, 8 Drawing Sheets

VEHICLE BODY REAR PORTION STRUCTURE

CROSS-REFERENCE TO RELATED APPLICATIONS

The present application is a national phase entry under 35 U.S.C. §371 of International Application No. PCT/JP2011/055231 filed on Mar. 7, 2011, published in Japanese, which claims priority from Japanese Patent Application No. 2010-123623 filed on May 29, 2010, all of which are incorporated herein by reference.

TECHNICAL FIELD

The present invention relates to a vehicle body rear portion structure.

BACKGROUND ART

In a case of conventional vehicles, such as electric cars and fuel cell vehicles, in which a large battery (an electric battery) must be mounted, a battery is arranged at a rear side of a seatback of a rear seat corresponding to a rear portion trunk of an ordinary automobile (see Patent Literature 1).

Also, an emergency stop switch is provided in the battery so as to stop the battery in an emergency and is covered up by an openable special cover so as not to be unintentionally operated since the emergency stop switch does not need to be operated in normal use of automobiles.

CITATION LIST

Patent Literature

[Patent Literature 1] Japanese Patent Laid-Open No. 2005-112284

SUMMARY OF INVENTION

Technical Problem

In the above conventional structure, since the battery is arranged at the rear side of the seatback of the rear seat in electric cars, fuel cell vehicles or the like, it is difficult to provide a space for placing a toolbox with the trunk occupied by the battery in a case of vehicles with a short front-back length.

Also, since the above battery is covered up by the special cover, more parts are required due to the cover to increase the number of parts, the structure is complicated, and it costs more to provide the cover to increase the manufacturing cost.

The present invention has been made in view of the aforementioned circumstances, and an object thereof is to provide a vehicle body rear portion structure in which a toolbox can be arranged on a rear side of a seatback even in a vehicle body rear portion structure of a vehicle with a short front-back length in which a large battery must be mounted, and which can also reduce the number of parts, simplify the structure, and lower the manufacturing cost.

Solution to Problem

The present invention has the following features:

a battery and a toolbox storage portion are provided in a laterally arranged state at a reverse side of a seatback of a vehicle, a toolbox stored in the above toolbox storage portion is exposed when the above seatback is tilted forward, and an emergency stop switch of the above battery is exposed so as to be operable when the above toolbox is removed from the above toolbox storage portion.

With the above configuration, since the battery and the toolbox storage portion are provided in a laterally arranged state at the reverse side of the seatback of the vehicle, the toolbox can be arranged on a rear side of the seatback even in a vehicle body rear portion structure of a vehicle with a short front-back length in which a large battery must be mounted.

Also, since the toolbox stored in the toolbox storage portion is exposed when the seatback is tilted forward and the emergency stop switch of the battery is exposed so as to be operable when the toolbox is removed from the toolbox storage portion, it is possible to cause an operator to perform a step of tilting the seatback forward and a step of removing the toolbox from the toolbox storage portion before the emergency stop switch of the battery is exposed so as to be operable, and the operator can be thereby prevented from easily touching the emergency stop switch.

Since the emergency stop switch is covered up by the toolbox as a means to prevent an operator from performing the above steps, a special cover for covering up the emergency stop switch does not need to be provided, so that the number of parts can be reduced, the structure can be simplified, and the manufacturing cost can be reduced.

In the present invention, when
a tool is stored in a position along a vertical direction in the above toolbox, a tool storage space and the toolbox can be made compact in a vehicle width direction. Accordingly, the toolbox storage portion provided in a state arranged laterally to the battery on the reverse side of the seatback of the vehicle can be also made compact in the vehicle width direction, so that the toolbox can be arranged at the rear side of the seatback even in the vehicle body rear portion structure of the vehicle with a short front-back length in which the large battery must be mounted.

In the present invention, when
the above toolbox is composed of a box body and a cover that covers an opening of the above box body, and
the above cover is operable to be opened when the above seatback is tilted forward, the tool can be removed from the box body without removing the box body from the toolbox storage portion.

In the present invention, a following advantage can be obtained when
a band that tightens and fixes the above cover and the box body to a vehicle body is provided, and
the tool is removed from the above box body by tilting the above seatback forward, releasing the above tightening band, and opening the above cover.

Since the band is used to tighten and fix the cover to the box body, and to tighten and fix the cover and the box body to the vehicle body, generation of abnormal sounds due to vibrations of the tool in the toolbox during running can be prevented.

Also, the tool can be removed from the box body when the seatback is tilted forward, the tightening band is released, and the cover is opened.

In the present invention, the following advantage can be obtained when
the above emergency stop switch is operable when the above seatback is tilted forward, the above tightening band is released, and the above toolbox is removed from the above toolbox storage portion.

It is possible to cause an operator to perform a step of tilting the seatback forward, a step of releasing the tightening band, and a step of removing the toolbox from the toolbox storage portion before the emergency stop switch of the battery is exposed so as to be operable.

Accordingly, access to the emergency stop switch is enabled only in a case of operation based on a clear intention of an operator, and unintentional operation of the emergency stop switch can be more reliably prevented.

In the present invention, when the above toolbox is formed of a foamed material, heat transfer from the toolbox to the seatback due to heat generation of the battery can be prevented. As a result, a temperature rise in the seatback can be suppressed, and a passenger can be prevented from feeling uncomfortable.

Advantageous Effects of Invention

The present invention can provide the vehicle body rear portion structure in which the toolbox can be arranged on the rear side of the seatback even in the vehicle body rear portion structure of the vehicle with a short front-back length in which the large battery must be mounted, and which can also reduce the number of parts, simplify the structure, and reduce the manufacturing cost.

DESCRIPTION OF EMBODIMENTS

Figure 1:
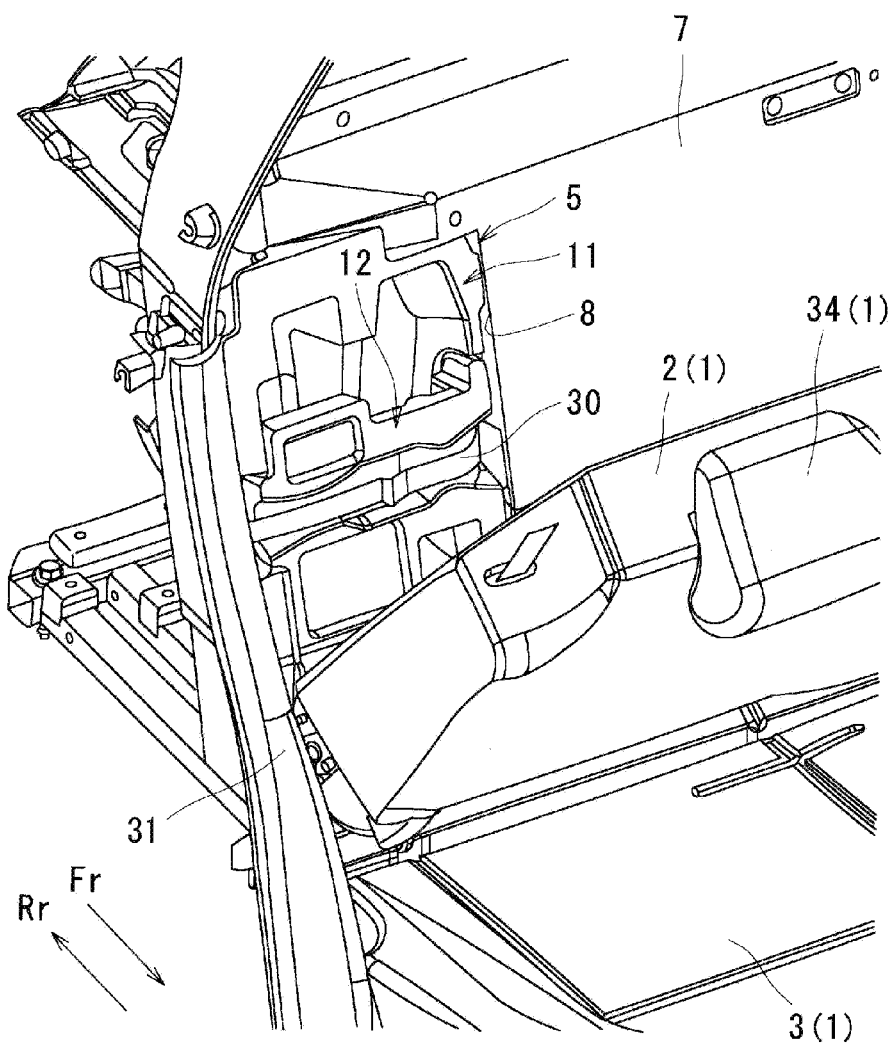
FIG. 1 is a perspective view of a vehicle body rear portion structure in a state in which a toolbox is stored in a toolbox storage portion.

In the following, an embodiment of the present invention will be described based on the drawings.

As shown in FIGS. 1, 2, 8, and 9, a large battery 4 (an electric battery) and a toolbox storage portion 5 are provided in a laterally arranged state at a reverse side (a vehicle rear side Rr) of a seatback 2 of a rear seat 1 to constitute a vehicle body rear portion structure of an electric car. The battery 4 occupies a large portion of a rear portion trunk at the reverse side of the seatback 2, and the toolbox storage portion 5 is formed smaller than the battery 4 on one end portion side (a right end portion side) in a width direction of the rear portion trunk.

The above rear seat 1 is composed of a seat cushion 3, the seatback 2 that is swingable about a lateral axis on a lower side with respect to the seat cushion 3, and a headrest 34. A right and left pair of vertical frames 31 are vertically provided on both sides of the seatback 2. Also, an upper-side lateral frame 6U (see FIG. 7) is suspended between upper end portions of the right and left pair of vertical frames 31, and a lower-side lateral frame 6K is suspended between lower end portions of the right and left pair of vertical frames 31. A vertical wall 7 that covers the battery 4 from a vehicle front side Fr is suspended between the right and left pair of vertical frames 31 and the upper and lower lateral frames 6U and 6K.

The upper-side lateral frame 6U and the lower-side lateral frame 6K described above are formed in a square pipe shape, and the right and left pair of vertical frames 31, the upper-side lateral frame 6U, and the lower-side lateral frame 6K constitute a battery bracket.

Figure 2:
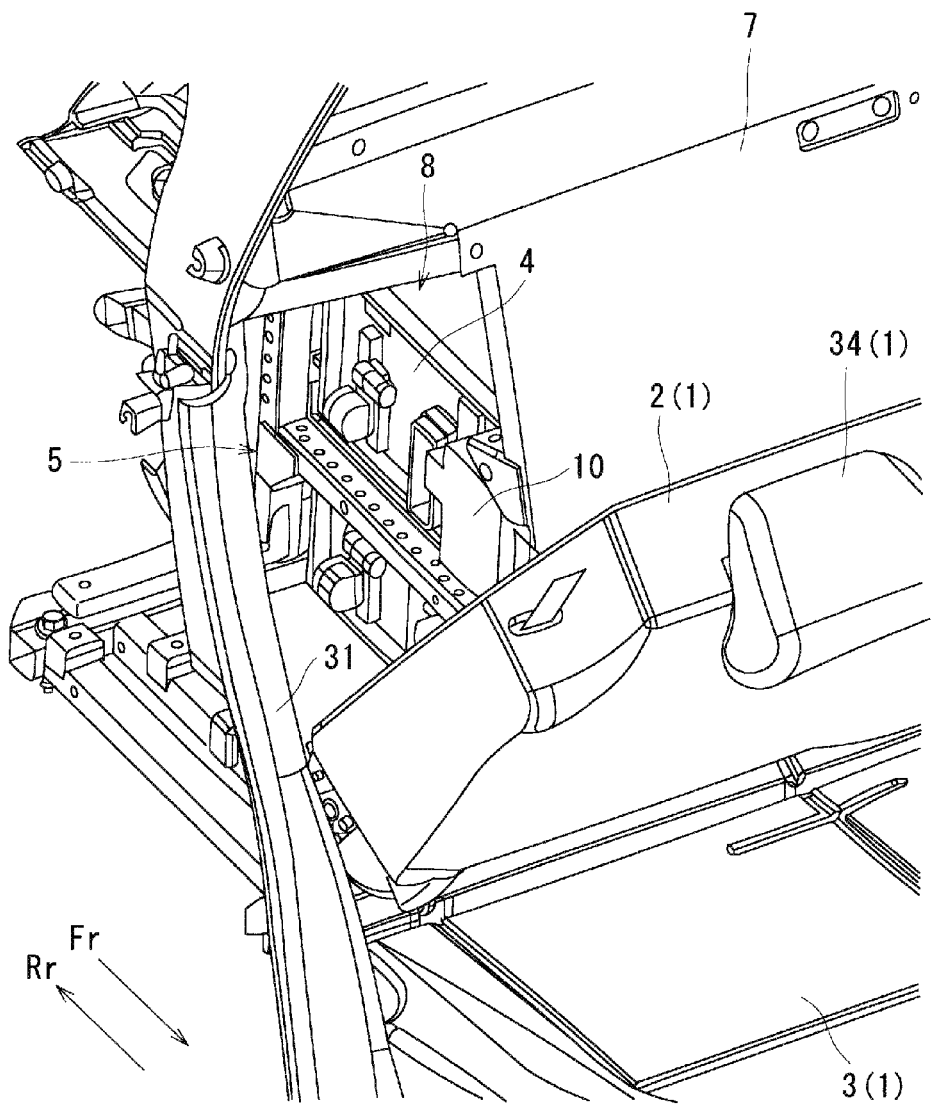
FIG. 2 is a perspective view of the vehicle body rear portion structure in a state in which the toolbox is removed from the toolbox storage portion.
Figure 7:
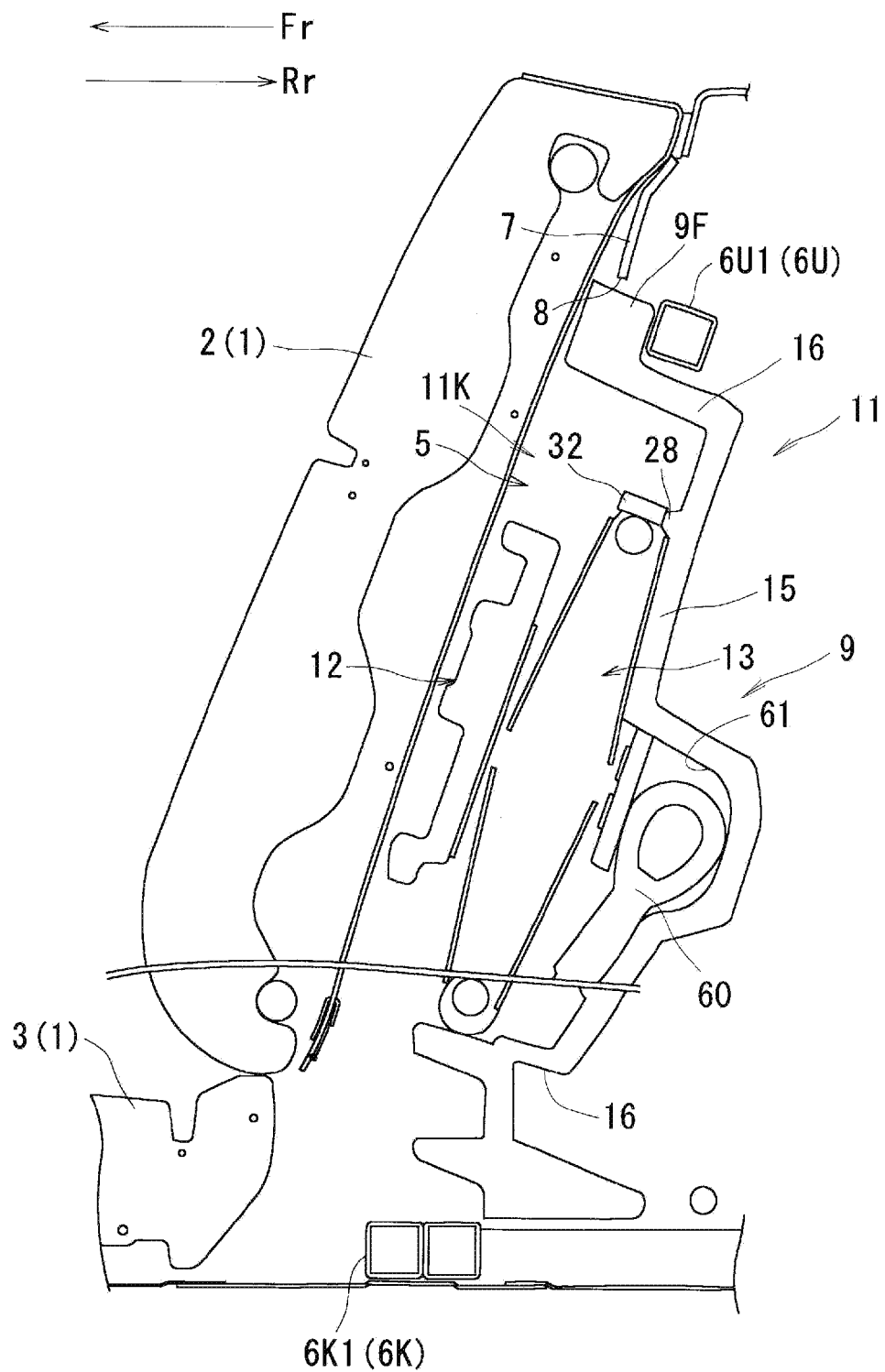
FIG. 7 is a sectional view along C-C of FIG. 4(a) (also illustrating a seatback or the like).
Figure 8:
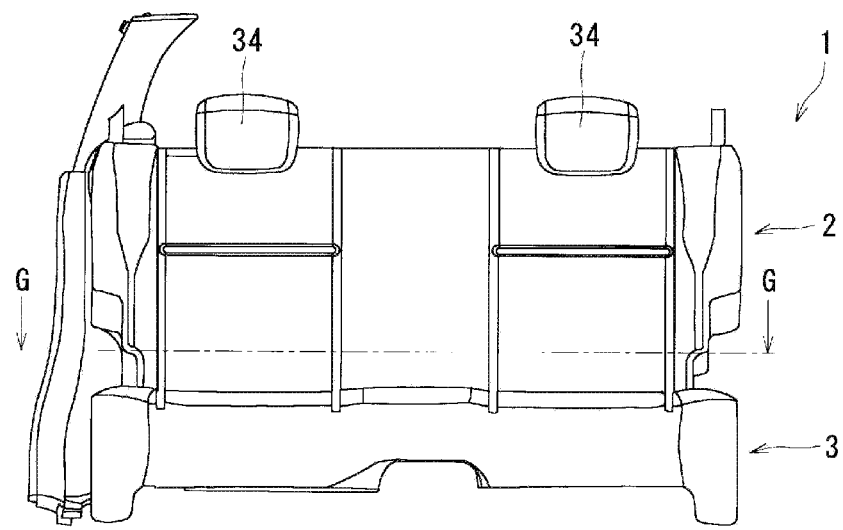
FIG. 8 is a front view (a view as viewed from a vehicle front side) of a rear seat.
Figure 9:
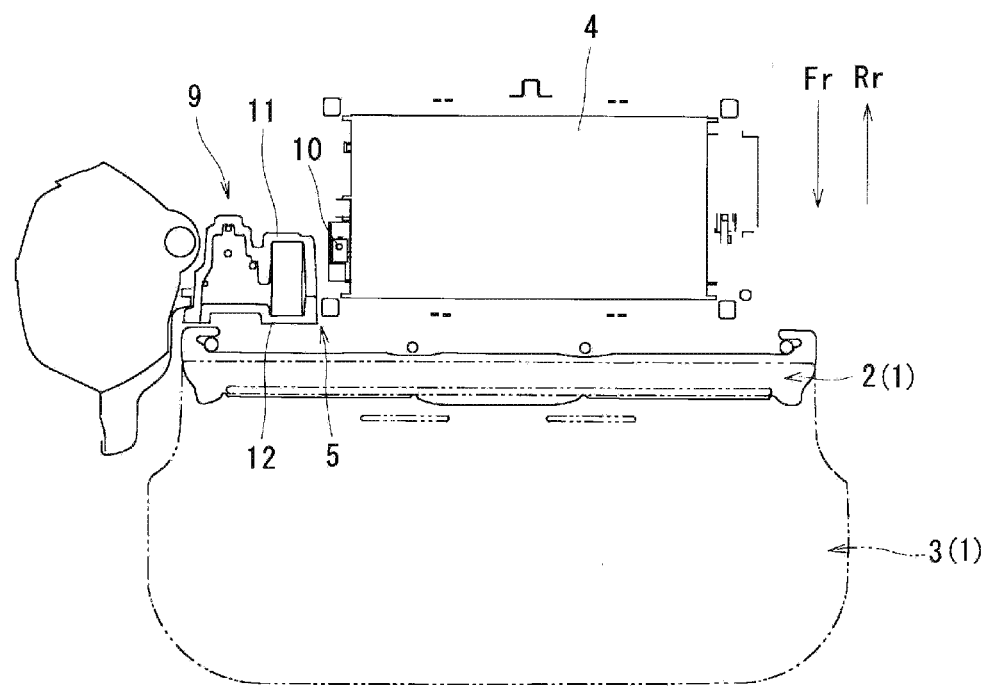
FIG. 9 is a sectional view along G-G of FIG. 8.

As shown in FIGS. 2 and 7, the above toolbox storage portion 5 is composed of a vertically-long square hole 8 formed in one end portion in a width direction of the vertical wall 7, an upper-side lateral frame portion 6U1 located on an upper end portion side of the square hole 8, and a lower-side lateral frame portion 6K1 located on a lower end portion side of the square hole 8. A toolbox 9 is stored in the toolbox storage portion 5 such that a longitudinal direction of the toolbox 9 is aligned with a vertical direction (more specifically, such that an upper side is located toward the vehicle rear side Rr).

The above toolbox 9 is loosely fitted to the square hole 8, a thick-walled flange portion 9F that projects upward from an upper end portion of the toolbox 9 is received and supported by the upper-side lateral frame portion 6U1 from the vehicle rear side Rr, and a lower end portion of the toolbox 9 is placed on the lower-side lateral frame portion 6K1. The toolbox 9 is stored in the toolbox storage portion 5 so as to be removable toward the vehicle front side Fr.

When the seatback 2 is tilted forward about the above lateral axis by unlocking a locking mechanism provided in the seatback 2, the toolbox 9 stored in the toolbox storage portion 5 is exposed, and when the toolbox 9 is removed toward the vehicle front side Fr from the toolbox storage portion 5, an emergency stop switch 10 of the battery 4 is exposed so as to be operable.

The seatback 2 in the above forward tilted state further swings toward the vehicle front side Fr from an inclined state shown in FIG. 1, and is thereby laid on the seat cushion 3. Accordingly, the toolbox 9 is largely exposed, and the toolbox 9 can be easily removed.

The above emergency stop switch 10 is a switch for stopping the battery 4 in an emergency, and is not required in normal use of automobiles. The switch is thus arranged on a back side of the toolbox 9 so as not to be unintentionally operated. However, it is necessary to enable access to the emergency stop switch 10 without using a special tool in an emergency. Thus, as described above, the emergency stop switch 10 of the battery 4 is configured such that the switch is exposed so as to be operable when the toolbox 9 is removed toward the vehicle front side Fr from the toolbox storage portion 5.

[Structure of the Toolbox 9]

The above toolbox 9 is composed of a box body 11 that stores a tool, and a cover 12 that covers an opening of the box body 11. The box body 11 and the cover 12 are formed of a lightweight foamed resin material having excellent moldability and heat insulation properties. When the seatback 2 is tilted forward, the cover 12 is operable to be removed from the box body 11.

Figure 3:
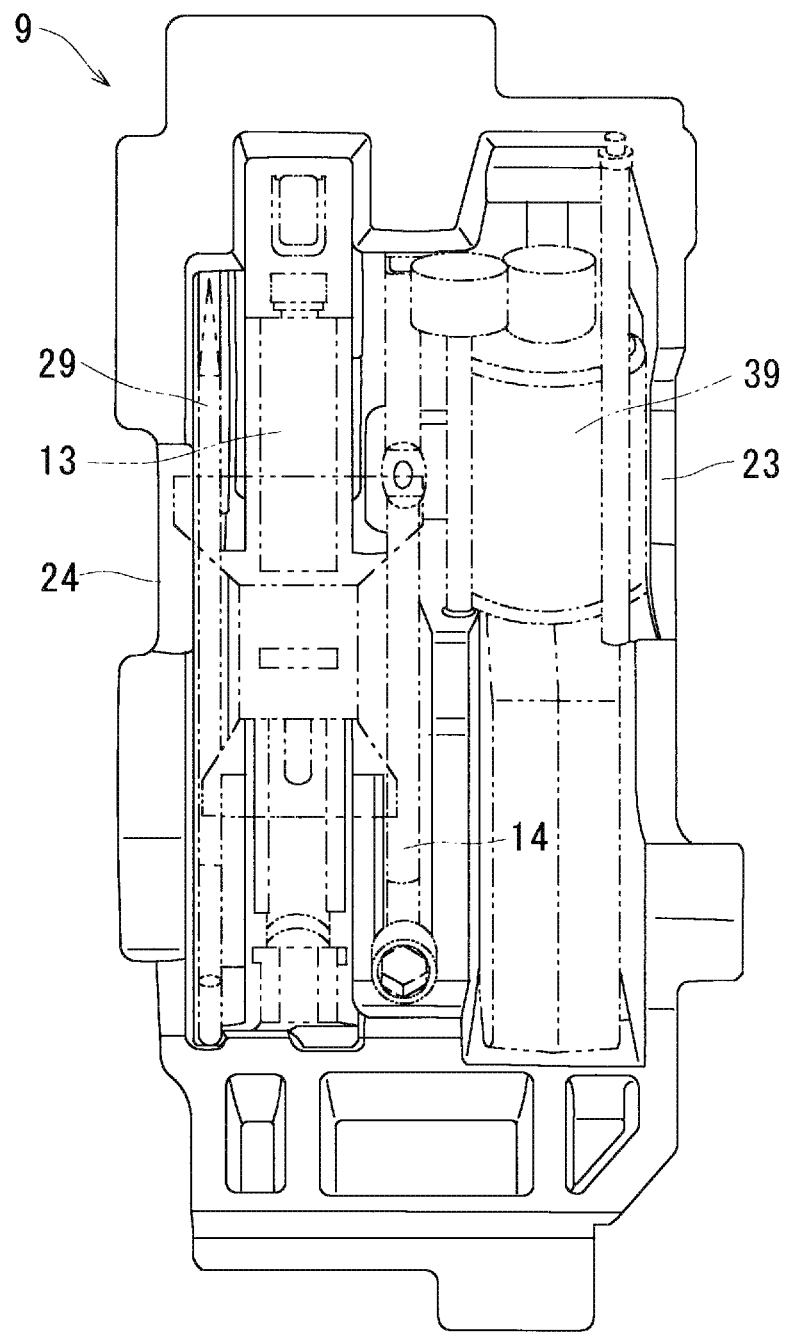
FIG. 3 is a view of a box body of the toolbox as viewed from an opening side of the toolbox.

The tool is stored in a position along the vertical direction in the box body 11 in a state in which the toolbox 9 is stored in the toolbox storage portion 5 (see FIGS. 1, 3, and 7). As indicated by alternating long and two short dashes line in FIG. 3, the tool stored in the box body 11 in the present embodiment includes tools for tire replacement such as a jack handle 29, a pantograph-type jack 13, a wheel wrench 14, and a flat tire repair kit 39.

Figure 4:
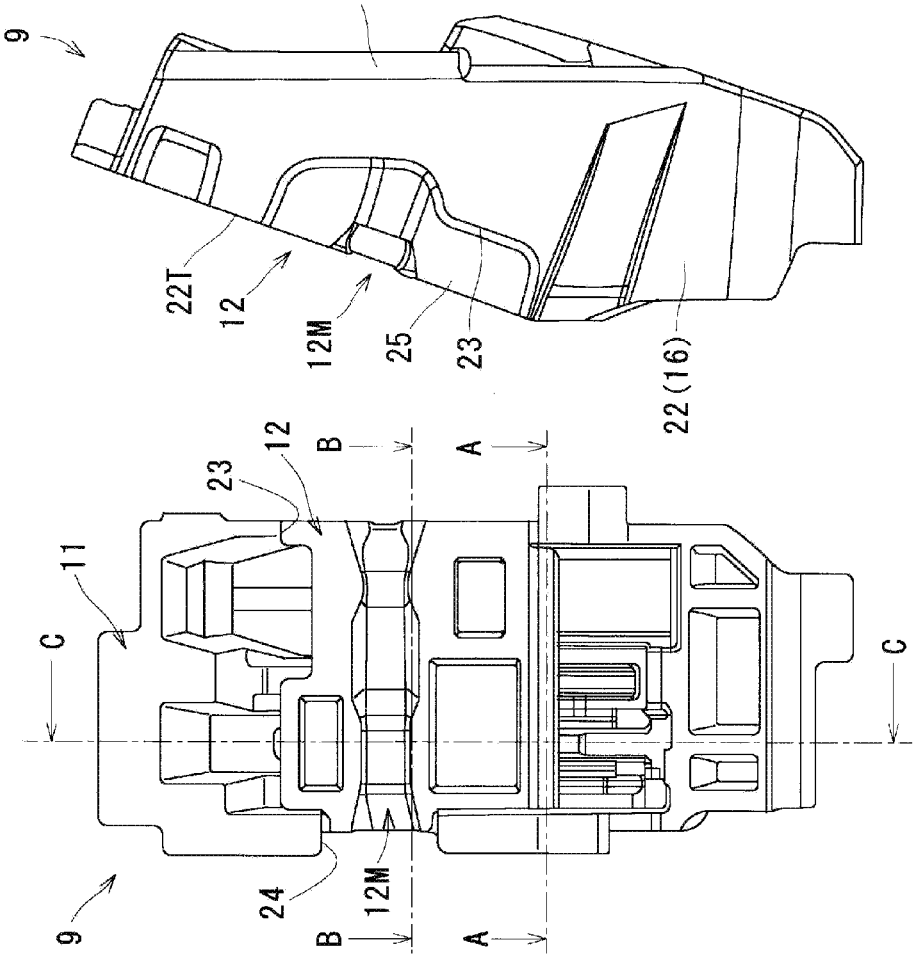
FIG. 4(a) is a view of the toolbox as viewed from the opening side.
FIG. 4(b) is a side view of the toolbox.
FIG. 4(c) is a side view of the box body of the toolbox.

As shown in FIGS. 4(*a*) to 4(*c*), 5, and 6, the box body 11 includes a bottom wall 15 (see FIG. 7) having a rectangular shape as viewed from an opening portion 11K (see FIGS. 5 to 7) side of the box body 11, a peripheral wall 16 having a rectangular shape in section that rises from a peripheral portion of the bottom wall 15, and a partition wall 17 that partitions storage portions 18, 19, 20, and 21 for the respective tools.

Figure 5:
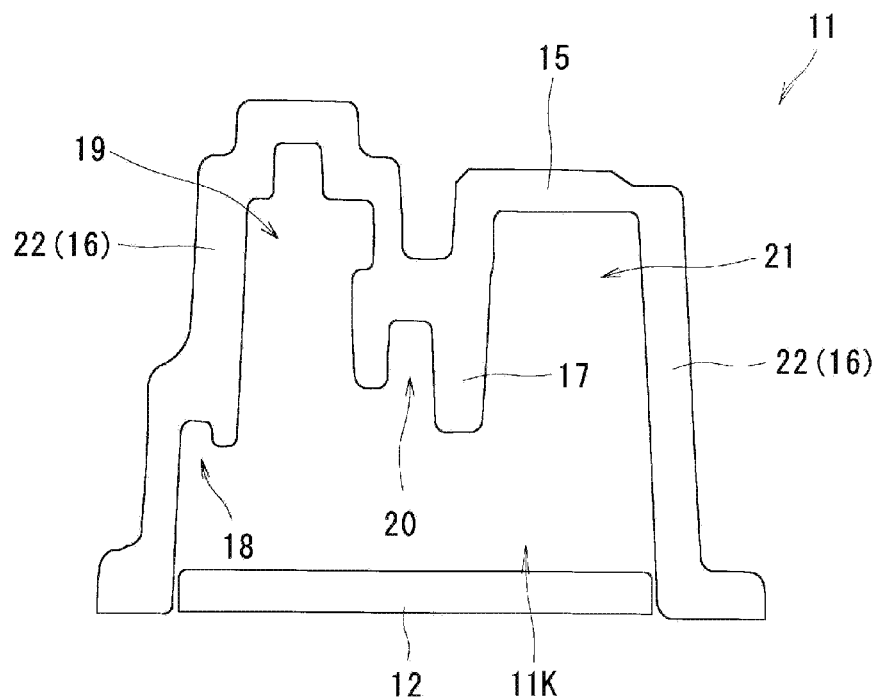
FIG. 5 is a sectional view along A-A of FIG. 4(a).

Since the long tools such as the jack 13 and the wheel wrench 14 are stored in the box body 11, the respective storage portions for the respective tools are formed in a rectangular shape along a longitudinal direction of the box body 11 and arranged in a width direction of the box body 11. That is, as shown in FIG. 5, the jack handle storage portion 18, the jack storage portion 19, the wheel wrench storage portion 20, and the flat tire repair kit storage portion 21 are respectively formed sequentially from one end portion side in the width direction.

As shown in FIG. 4(*c*), top surfaces 22T of side walls 22 in an upper half portion that is located on the upper side in the above storage state out of side walls 22 constituting the above peripheral wall 16 are inclined such that the height dimension decreases toward the upper side in a state in which the toolbox 9 is stored in the toolbox storage portion 5. Accordingly, interference between a reverse surface (see FIG. 7) of the seatback 2 inclined such that an upper end portion side is located toward the vehicle rear side Rr, and the top surfaces 22T of the side walls 22 of the toolbox 9 can be avoided.

As shown in FIGS. 4(*a*) and 4(*c*), cutouts 23 and 24 that are opened toward an outer side (an opposite side to the bottom wall 15) of the opening portion 11K (see FIGS. 5 to 7) are formed in longitudinal intermediate portions of the both side walls 22 of the above box body 11. One of the cutouts 23 located on a vehicle-width inner side is formed longer in the longitudinal direction of the box body 11 and deeper than the other cutout 24 located on a vehicle-width outer side.

As shown in FIG. 4(*c*), the above one of the cutouts 23 is formed long in the longitudinal direction of the top surface 22T of the side wall 22, a cutout portion 23A in a lower half portion that is located on the lower side in a state in which the toolbox 9 is stored in the toolbox storage portion 5 is formed in a rectangular shape that is long in the longitudinal direction of the above top surface 22T, and a cutout portion 23B in the upper half portion is formed in a deeper shape than the cutout portion 23A in the above lower half portion, so that the both cutout portions are smoothly continuous to each other.

Figure 10:
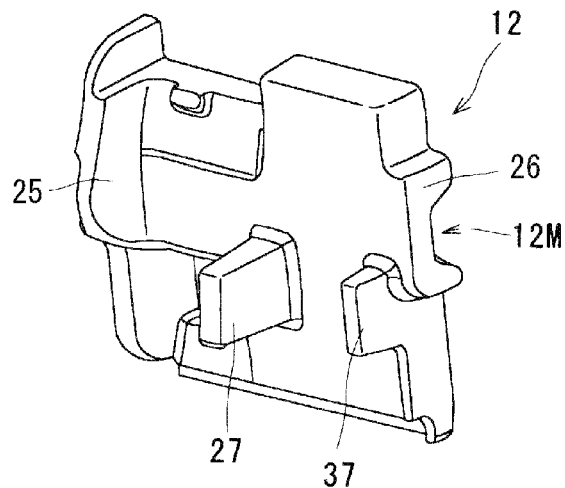
FIG. 10 is a perspective view of a cover.

As shown in FIG. 10, a right and left pair of fitting convex portions 25 and 26 fitted to the above cutouts 23 and 24 are provided on the cover 12. The above right and left pair of fitting convex portions 25 and 26 are separately fitted to the right and left pair of cutouts 23 and 24, so that the cover 12 is mounted to top portions of the both side walls 22 in the longitudinal intermediate portion of the box body 11. The fitting convex portions 25 and 26 are formed in a shape corresponding to the cutouts 23 and 24 of the box body 11, and are fitted to the above cutouts 23 and 24 to constitute a portion of the side walls of the toolbox 9.

The cover 12 is set to be shorter than the length of the box body 11, and both longitudinal end portions (both vertical end portions) of the respective tools are exposed in a state in which the cover 12 is mounted to the box body 11. Accordingly, it is possible to check whether or not the respective tools are stored, and the cover 12 can be reduced in size, weight, and material cost.

Figure 6:
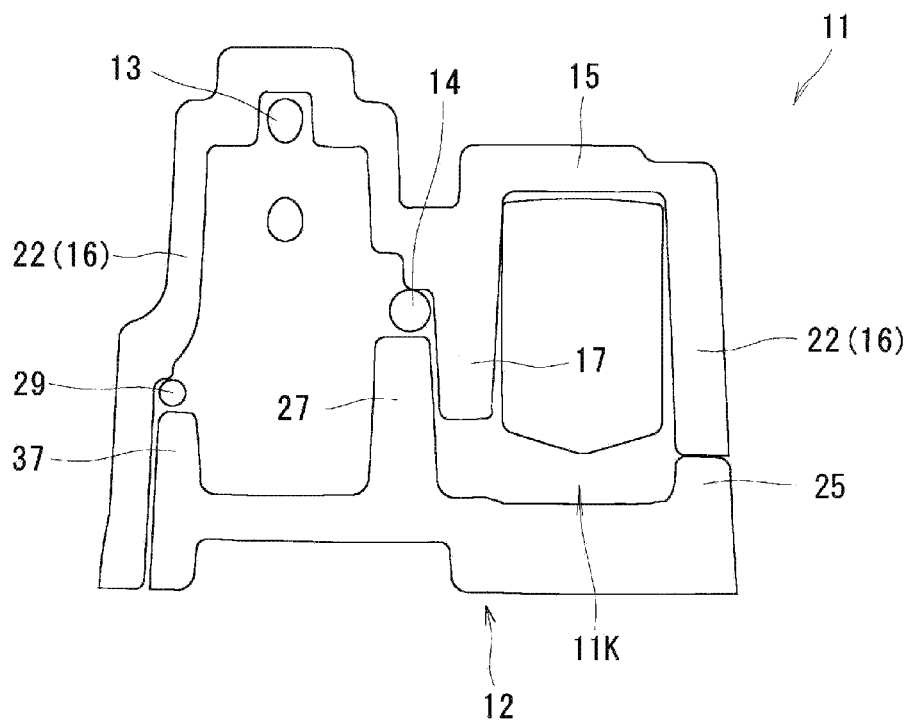
FIG. 6 is a sectional view along B-B of FIG. 4(a).

As shown in FIGS. 5 and 6, both end portions in a width direction of the above cover 12 are fitted (internally fitted) between the both side walls 22 of the box body 11 such that a closed section is formed in the toolbox 9 in a state in which the cover 12 where the fitting convex portions 25 and 26 are fitted to the above cutouts 23 and 24 is mounted to the box body 11.

As described above, the fitting convex portions 25 and 26 of the cover 12 are fitted to the cutouts 23 and 24 of the box body 11, and the cover 12 is fitted between the both side walls 22 of the box body 11, so that the cover 12 can be firmly fixed to the box body 11. Since the closed section is formed in a state in which the cover 12 is mounted to the box body 11, the rigidity and strength of the toolbox 9 can be ensured even when the toolbox 9 is set to be thin-walled, so that the toolbox 9 can be reduced in size, weight, and space.

As shown in FIG. 10, a right and left pair of first convex portions 27 and 37 having a rectangular shape in section are provided projecting on a reverse side of an end portion in the width direction of the cover 12, and a reverse side of a width center portion such that a longitudinal intermediate portion of the jack handle 29 in the jack handle storage portion 18 of the box body 11, and a longitudinal intermediate portion of the wheel wrench 14 in the wheel wrench storage portion 20 are separately pressed by the above right and left pair of first convex portions 27 and 37 from the vehicle front side Fr as shown in FIGS. 5 and 6 in a state in which the cover 12 is mounted to the box body 11.

The above first convex portions 27 and 37 are located between the adjacent tools in the box body 11 to prevent interference between the adjacent tools and thereby prevent generation of sounds due to interference.

Accordingly, the tools can be reliably fixed to the box body 11, and movement of the tools in the box body 11 can be prevented. That is, even when such a layout that the jack handle 29 and the wheel wrench 14 three-dimensionally cross the jack 13 (see FIG. 3) is employed, the jack 13 and the jack handle 29, and the jack 13 and the wheel wrench 14 can be prevented from colliding with each other, and the generation of sounds can be thereby prevented.

Figure 11:
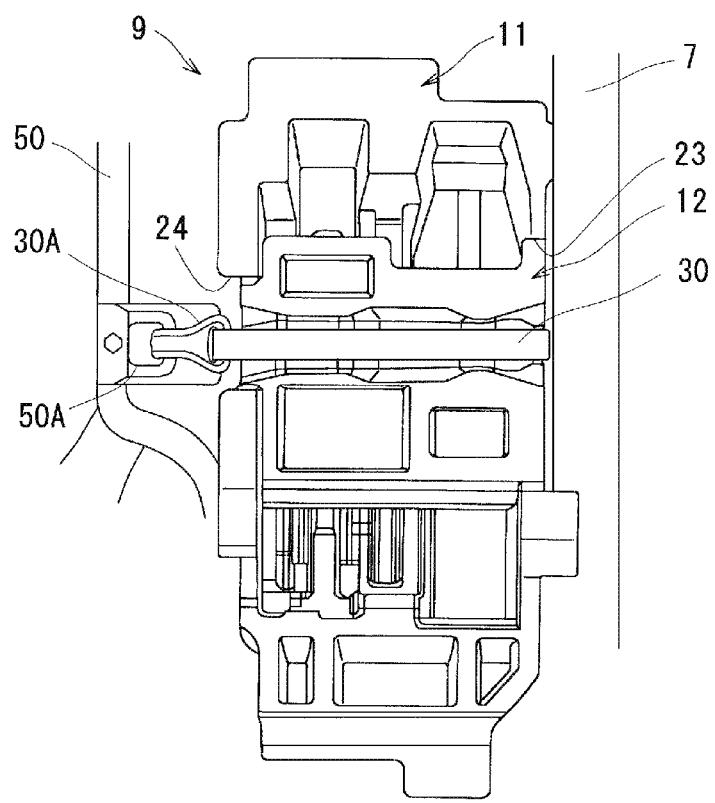
FIG. 11 is a view of the toolbox tightened and fixed by a band as viewed from the opening side of the toolbox (not illustrating a tool).

As shown in FIGS. 1 and 11, a band 30 that tightens and fixes the above cover 12 to the above box body 11 and tightens and fixes the cover 12 and the box body 11 to a vehicle body is provided. One end portion of the band 30 is fixed to the above vertical wall 7. A hook 30A is provided in the other end portion of the band 30 such that the hook 30A is engaged with an engagement portion 50A provided in a quarter panel 50. A groove 12M (see FIG. 4(*a*)) for winding the band in the width direction of the cover 12 is formed in a front-side surface of the cover 12.

The cover 12 is tightened and fixed to the box body 11, and the cover 12 and the box body 11 are tightened and fixed to the vehicle body by the above band 30, so that generation of abnormal sounds due to vibrations of the tools in the toolbox 9 during running can be prevented.

Also, as described above, the jack 13 (or another tool) in the box body 11 is held and fixed between the cover 12 and the bottom wall 15 of the box body 11 by tightening the cover 12 to the above box body 11 by the band 30. Accordingly, the jack 13 can be more reliably fixed to the box body 11 by increasing a holding force on the jack 13.

As shown in FIG. 7, a second convex portion 28 in pressure-contact with a jack ring 32 through which a shaft of the jack 13 is inserted in a state in which the jack 13 is held between the cover 12 and the bottom wall 15 of the box body 11 is provided projecting on the bottom wall 15 of the box body 11. The second convex portion 28 in pressure-contact with the above jack ring 32 may be also provided projecting on a reverse side of the cover 12.

The jack ring 32 is a member adjacent to a U-shaped portion to be engaged with which an engagement portion of the jack handle 29 is engaged. When the above portion to be engaged is rotationally operated by an operator via the jack handle 29, the jack 13 extends and contracts with the shaft of the jack 13 rotating about the axis of the shaft.

In the jack 13 having the structure as described above, when the above second convex portion 28 is brought into abutment against the jack ring 32, a force in an opposite direction to a pressing force from the cover 12 is applied to the jack ring 32. Accordingly, the jack ring 32 is fixed to the box body 11, and the shaft of the jack 13 is also pressed by the jack ring 32 and fixed to the box body 11, so that generation of so-called clattering sounds can be prevented and unpleasant sound generation can be prevented since movement of the jack ring 32 and the shaft as a noise generation source of the jack 13 is inhibited.

Normally, when tools are arranged on a board in an upper portion of a spare tire in a trunk, the plurality of tools are mostly arranged horizontally along a trunk space so as to be stored as flatly as possible, and thus, a large area is required. On the other hand, with the aforementioned configuration in the present invention, the toolbox 9 is arranged in the vertically-placed position that is vertically long along the reverse surface of the seatback 2, so that the long tools such as the jack 13 and the wheel wrench 14 can be three-dimensionally arranged so as to be displaced in a vehicle front-back direction as shown in FIGS. 3 and 7. Reference numeral 60 in FIG. 7 denotes a towing hook bolt, which is stored in a hook bolt storage portion 61 on the bottom wall 15 side from the jack 13. Accordingly, the toolbox 9 can be further reduced in size, space, and material cost.

[Removal of the Tools]

In the aforementioned structure, the tools are removed from the toolbox 9 in the following way.

(1) The seatback 2 is tilted forward by unlocking the locking mechanism of the seatback 2.
(2) The above tightening band 30 is released from the vehicle front side Fr (the rear seat 1 side).
(3) The cover 12 is opened and removed from the box body 11, and the tools are removed from the box body 11.

As described above, the tools can be removed from the box body 11 without removing the box body 11 from the toolbox storage portion 5. Also, since the toolbox 9 is stored in the toolbox storage portion 5 in such an inclined position that the upper side is located toward the vehicle rear side Rr, a passenger can remove the cover 12 of the toolbox 9 from the front upper side and thereby easily removes the tools. When the tools are stored in the respective storage portions of the toolbox 9, the tools are stored in a procedure opposite to the above procedure.

[Operation of the Emergency Stop Switch 10]

The emergency stop switch 10 of the battery 4 is accessed in an emergency by the following procedure.

(1) The seatback 2 is tilted forward by unlocking the locking mechanism of the seatback 2.
(2) The above tightening band 30 is released from the vehicle front side Fr (the rear seat 1 side).
(3) The toolbox 9 is removed from the toolbox storage portion 5. Accordingly, the emergency stop switch 10 is exposed through the opening (the square hole 8) of the vertical wall 7, and the emergency stop switch 10 becomes operable.

It is possible to cause an operator to perform a step of tilting the seatback 2 forward, a step of releasing the tightening band 30, and a step of removing the toolbox 9 from the toolbox storage portion 5 before the emergency stop switch 10 of the battery 4 is exposed so as to be operable.

Accordingly, the access to the emergency stop switch 10 is enabled only in a case of operation based on a clear intention of an operator, and unintentional operation of the emergency stop switch 10 can be more reliably prevented.

Since the emergency stop switch 10 is covered up by the toolbox 9 as means to cause an operator to perform the above steps, a special cover 12 for covering up the emergency stop switch 10 does not need to be provided, so that the number of parts can be reduced, the structure can be simplified, and the manufacturing cost can be lowered.

Moreover, since the box body 11 and the cover 12 of the toolbox 9 are formed of the foamed resin material having heat insulation properties, heat transfer from the opening (the square hole 8) of the vertical wall 7 to the seatback 2 due to heat generation of the battery 4 can be prevented. As a result, a temperature rise in the seatback 2 can be suppressed, and a passenger can be prevented from feeling uncomfortable.

With the above configuration, since the battery 4 and the toolbox storage portion 5 are provided in a laterally arranged state on the reverse side of the above seatback 2, the toolbox 9 can be arranged on the rear side of the seatback 2 even in a vehicle body rear portion structure of a vehicle with a short front-back length in which the large battery 4 must be mounted.

Other Embodiments

The present invention is not limited to electric cars, and it may also be applied to fuel cell vehicles.

REFERENCE SIGNS LIST

2 Seatback
4 Battery
5 Toolbox storage portion
9 Toolbox
10 Emergency stop switch
11 Box body
12 Cover
28 Second convex portion
30 Band
32 Jack ring

The invention claimed is:

1. A vehicle body rear portion structure,
wherein a battery and a toolbox storage portion are provided in a laterally arranged state at a reverse side of a seatback of a vehicle,
wherein a toolbox stored in said toolbox storage portion is exposed when the above seatback is tilted forward, and
wherein an emergency stop switch of said battery is exposed so as to be operable when said toolbox is removed from said toolbox storage portion.

2. The vehicle body rear portion structure according to claim 1, wherein a tool is stored in a position along a vertical direction in said toolbox.

3. The vehicle body rear portion structure according to claim 1, wherein said toolbox is composed of a box body and a cover that covers an opening of said box body, and said cover is operable to be opened when said seatback is tilted forward.

4. The vehicle body rear portion structure according to claim 3, wherein a tightening band that tightens and fixes said cover and said box body to a vehicle body is provided, and the tool is removed from said box body by tilting said seatback forward, releasing said tightening band, and opening said cover.

5. The vehicle body rear portion structure according to claim 4, wherein said emergency stop switch is operable when said seatback is tilted forward, said tightening band is released, and the above toolbox is removed from said toolbox storage portion.

6. The vehicle body rear portion structure according to claim 1, wherein said toolbox is formed of a foamed material.

* * * * *